US011111883B2

United States Patent
Kugo et al.

(10) Patent No.: US 11,111,883 B2
(45) Date of Patent: Sep. 7, 2021

(54) DIAGNOSTIC APPARATUS FOR EVAPORATIVE FUEL PROCESSING SYSTEM

(71) Applicant: SUBARU CORPORATION, Tokyo (JP)

(72) Inventors: Daisuke Kugo, Tokyo (JP); Masahiro Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 275 days.

(21) Appl. No.: 16/438,538

(22) Filed: Jun. 12, 2019

(65) Prior Publication Data

US 2020/0063695 A1 Feb. 27, 2020

(30) Foreign Application Priority Data

Aug. 24, 2018 (JP) .............................. JP2018-157285

(51) Int. Cl.
*F02M 25/08* (2006.01)
*F02M 25/022* (2006.01)

(52) U.S. Cl.
CPC .... *F02M 25/0227* (2013.01); *F02M 25/0809* (2013.01); *F02M 25/0836* (2013.01)

(58) Field of Classification Search
CPC ........... F02M 25/0227; F02M 25/0809; F02M 25/0836
See application file for complete search history.

(56) References Cited

U.S. PATENT DOCUMENTS 5,295,472 A    3/1994   Otsuka et al.
5,396,873 A    3/1995   Yamanaka et al.
               (Continued)

FOREIGN PATENT DOCUMENTS

EP    3 418 547 A1    12/2018
JP    5-288124 A      11/1993
               (Continued)

OTHER PUBLICATIONS

Notice of Reasons for Refusal issued in corresponding Japanese Patent Application No. 2018-157285 dated Feb. 25, 2020, with machine translation.

*Primary Examiner* — George C Jin
*Assistant Examiner* — Teuta B Holbrook
(74) *Attorney, Agent, or Firm* — Troutman Pepper Hamilton Sanders LLP

(57) ABSTRACT

A diagnostic apparatus includes a fuel tank; a canister adsorbing evaporative fuel; an upstream purge line allowing the canister and an engine intake system to communicate upstream of a pressure charger; an upstream purge valve that opens and closes the upstream purge line; a pressure detector detecting pressure in the upstream purge line; a valve controller that opens and closes the upstream purge valve during pressure-charging and non-pressure-charging; a timekeeper measuring an accumulative time in which a diagnosis execution condition is satisfied after a purge-flow diagnosis starts; and a determiner determining whether evaporative fuel processing system operates normally or abnormally depending on whether the pressure decreases by a predetermined pressure or more from the start of the diagnosis. Every time the upstream purge valve opens after the condition is satisfied, the timekeeper measures the accumulative time after a predetermined delay time elapses from when a valve opening command is output.

18 Claims, 4 Drawing Sheets

(56) References Cited

U.S. PATENT DOCUMENTS

| | | |
|---|---|---|
| 5,425,344 A | 6/1995 | Otsuka et al. |
| 5,542,397 A | 8/1996 | Takahata et al. |
| 6,782,874 B1 | 8/2004 | Matsumoto |
| 2013/0199504 A1* | 8/2013 | Takeishi ............. F02M 25/0809 |
| | | 123/520 |
| 2015/0020780 A1 | 1/2015 | Takakura et al. |
| 2016/0273493 A1 | 9/2016 | Ono |
| 2017/0030302 A1 | 2/2017 | Takezawa et al. |
| 2017/0276078 A1* | 9/2017 | Imaizumi ............ F02D 41/0007 |
| 2018/0135565 A1* | 5/2018 | Choi ................... F02D 41/0032 |
| 2019/0353119 A1* | 11/2019 | Choi ................... F02M 25/0854 |
| 2019/0368431 A1* | 12/2019 | Dudar .................. F02D 41/003 |
| 2020/0003164 A1* | 1/2020 | Choi ................... G07C 5/0808 |

FOREIGN PATENT DOCUMENTS

| | | |
|---|---|---|
| JP | 6-42414 A | 2/1994 |
| JP | 6-288307 A | 10/1994 |
| JP | 7-305659 A | 11/1995 |
| JP | 9-303214 A | 11/1997 |
| JP | 2003-286911 A | 10/2003 |
| JP | 2004-346792 A | 12/2004 |
| JP | 2016-176337 A | 10/2016 |
| JP | 2017-125422 A | 7/2017 |
| WO | 2005-080935 A1 | 9/2005 |
| WO | 2013-133234 A1 | 9/2013 |
| WO | 2015-182174 A1 | 12/2015 |
| WO | 2017-164320 A1 | 9/2017 |

\* cited by examiner

DIAGNOSTIC APPARATUS FOR EVAPORATIVE FUEL PROCESSING SYSTEM

CROSS-REFERENCE TO RELATED APPLICATIONS

The present application claims priority from Japanese Patent Application No. 2018-157285 filed on Aug. 24, 2018, the entire contents of which are hereby incorporated by reference.

BACKGROUND

The disclosure relates to diagnostic apparatuses for evaporative fuel processing systems that cause evaporative fuel generated in fuel tanks to be suctioned into and combusted in intake systems of engines so as to process the evaporative fuel. In particular, the disclosure relates to a diagnostic apparatus that performs a diagnosis for determining whether a purge flow in an evaporative fuel processing system is normal.

An evaporative fuel processing system (i.e., an evaporative fuel purging system) widely used in the related art prevents evaporative fuel generated in a fuel tank from being released to the environment (atmosphere) by causing the evaporative fuel to be temporarily adsorbed to an adsorbent in a canister and causing the adsorbed evaporative fuel to be suctioned into and combusted in an intake system of an engine under a predetermined operational condition so as to process the evaporative fuel.

Furthermore, for instance, the evaporative fuel processing system is also applied to an engine having a pressure charger, such as a turbocharger. The evaporative fuel processing system includes an upstream purge line that allows the canister and the upstream side of the pressure charger (e.g., a pre-turbocharge duct) to communicate with each other, in addition to a downstream purge line that allows the canister and the downstream side of the pressure charger (e.g., an intake manifold) to communicate with each other, so that the evaporative fuel adsorbed in the canister can also be purged when pressure-charging is performed (e.g., when the pressure in the intake manifold is a positive value). The evaporative fuel processing system opens a downstream purge valve disposed in the downstream purge line when pressure-charging is not performed (i.e., when the pressure in the intake manifold is a negative value), and opens an upstream purge valve disposed in the upstream purge line when pressure-charging is performed (i.e., when the pressure in the intake manifold is a positive value).

In on-board diagnostics second generation (OBD2), it is demanded that an abnormal diagnosis (i.e., a purge-flow diagnosis) of such an evaporative fuel processing system be performed. A specific example of such an abnormal diagnosis is a diagnosis for determining whether a purge flow has actually occurred in a scene where purging to the engine is performed via a purge line. Japanese Unexamined Patent Application Publication (JP-A) No. 2016-176337 discloses an evaporative fuel processing apparatus that detects an abnormality in an upstream purge passage (purge line) coupled to the upstream side of a pressure charger in an intake passage.

More specifically, the evaporative fuel processing apparatus disclosed in JP-A No. 2016-176337 opens an upstream purge valve when pressure-charging is performed. If the pressure in the upstream purge line reaches an upstream-pressure threshold value or lower within a predetermined period, the evaporative fuel processing apparatus determines that there is no abnormality in the purge flow. If the pressure does not reach the upstream-pressure threshold value or lower within the predetermined period, the evaporative fuel processing apparatus determines that there is an abnormality in the purge flow.

SUMMARY

An aspect of the disclosure provides a diagnostic apparatus for an evaporative fuel processing system. The diagnostic apparatus includes a fuel tank, a canister, an upstream purge line, an upstream purge valve, a pressure detector, a valve controller, a first timekeeper, and a determiner. The fuel tank is configured to retain fuel to be fed to an engine equipped with a pressure charger. The canister is configured to communicate with the fuel tank and is capable of adsorbing evaporative fuel generated in the fuel tank. The upstream purge line is configured to allow the canister and an intake system of the engine to communicate with each other at an upstream side of the pressure charger. The upstream purge valve is disposed in the upstream purge line and is configured to open and close the upstream purge line. The pressure detector is configured to detect pressure in the upstream purge line. The valve controller is configured to open the upstream purge valve when pressure-charging is performed by the pressure charger and to close the upstream purge valve during non-pressure-charging. The first timekeeper is configured to accumulatively measure a time in which a diagnosis execution condition, including an amount of air taken into the engine and an open-close status of the upstream purge valve, is satisfied after the diagnosis execution condition is satisfied and a diagnosis for a purge flow in the upstream purge line is started. The determiner is configured to determine that the evaporative fuel processing system operates normally if the pressure in the upstream purge line detected by the pressure detector decreases by a predetermined pressure or more from the start of the diagnosis until an accumulative time measured by the first timekeeper reaches a predetermined time, and to determine that the evaporative fuel processing system operates abnormally if the pressure in the upstream purge line does not decrease by the predetermined pressure or more from the start of the diagnosis. Every time the upstream purge valve is opened after the diagnosis execution condition is satisfied, the first timekeeper accumulatively measures the time in which the diagnosis execution condition is satisfied after a predetermined delay time elapses from when a command for opening the upstream purge valve is output.

An aspect of the disclosure provides a diagnostic apparatus for an evaporative fuel processing system. The diagnostic apparatus includes a fuel tank, a canister, an upstream purge line, an upstream purge valve, a pressure detector, and circuitry. The fuel tank is configured to retain fuel to be fed to an engine equipped with a pressure charger. The canister is configured to communicate with the fuel tank and is capable of adsorbing evaporative fuel generated in the fuel tank. The upstream purge line is configured to allow the canister and an intake system of the engine to communicate with each other at an upstream side of the pressure charger. The upstream purge valve is disposed in the upstream purge line and is configured to open and close the upstream purge line. The pressure detector is configured to detect pressure in the upstream purge line. The valve controller is configured to open the upstream purge valve when pressure-charging is performed by the pressure charger and to close the upstream purge valve during non-pressure-charging. The circuitry is configured to accumulatively measure a time in which a diagnosis execution condition, including an amount of air taken into the engine and an open-close status of the upstream purge valve, is satisfied after the diagnosis execution condition is satisfied and a diagnosis for a purge flow in the upstream purge line is started. The circuitry is configured to determine that the evaporative fuel processing system operates normally if the pressure in the upstream purge line detected by the pressure detector decreases by a predetermined pressure or more from the start of the diagnosis until an accumulative time measured by the first timekeeper reaches a predetermined time, and to determine that the evaporative fuel processing system operates abnormally if the pressure in the upstream purge line does not decrease by the predetermined pressure or more from the start of the diagnosis. Every time the upstream purge valve is opened after the diagnosis execution condition is satisfied, the circuitry accumulatively measures the time in which the diagnosis execution condition is satisfied after a predetermined delay time elapses from when a command for opening the upstream purge valve is output.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
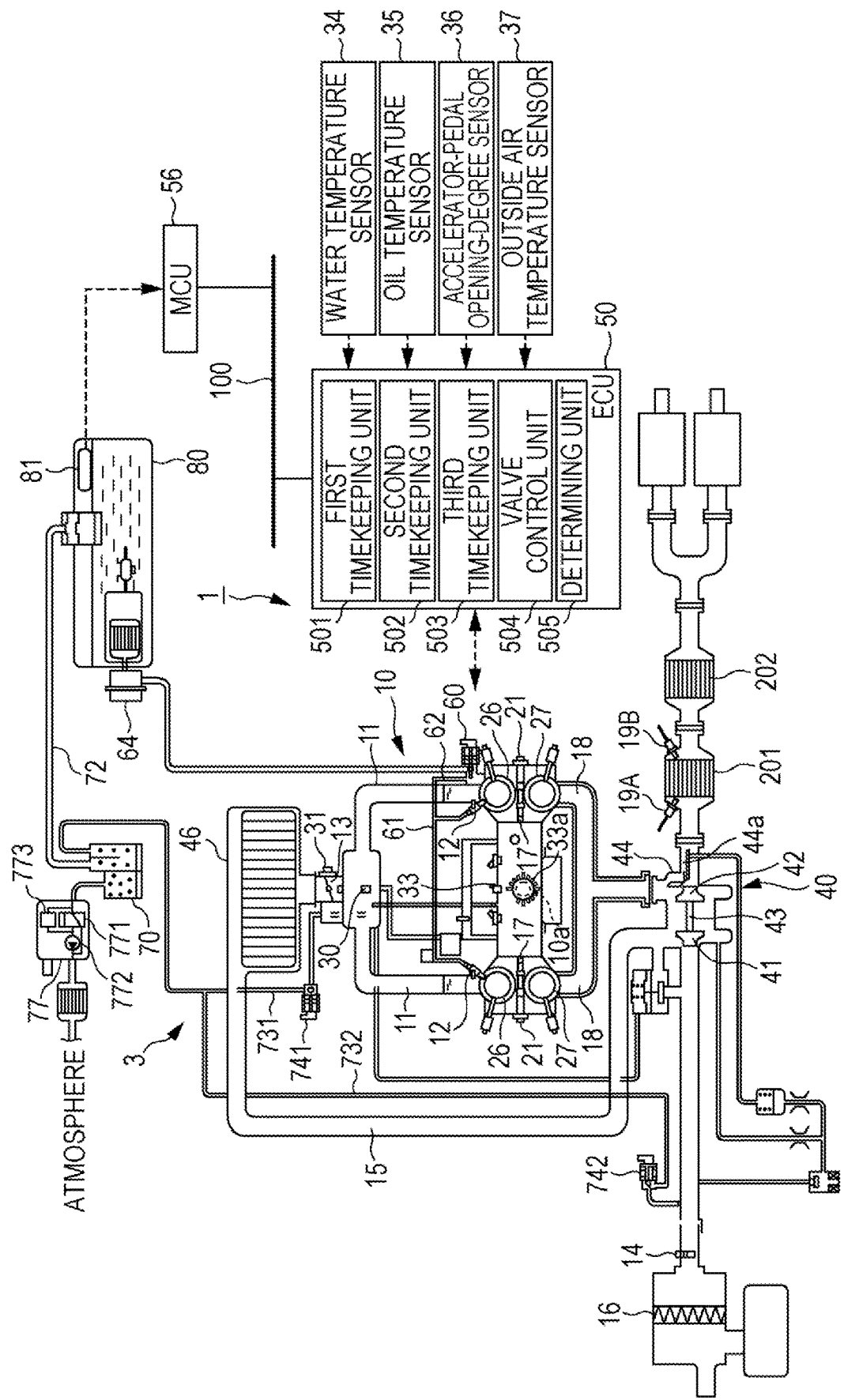
FIG. 1 illustrates the configuration of a diagnostic apparatus for an evaporative fuel processing system according to an embodiment and the configuration of an engine to which the diagnostic apparatus is applied.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. There is a response delay from when a command for opening an upstream purge valve is output to when the pressure starts to decrease as a result of evaporative fuel (i.e., purge air) being actually suctioned through the upstream purge valve. Assuming a case where a diagnosis execution condition is intermittently satisfied during a diagnosis, such as a case where pressure-charging is temporarily interrupted during the diagnosis and is subsequently resumed (i.e., a case where the upstream purge valve is temporarily closed during the diagnosis and is subsequently opened again), a response delay time (i.e., an ineffective time) occurs every time the diagnosis execution condition is satisfied and the upstream purge valve is opened. Therefore, for instance, in a case where the aforementioned predetermined period in JP-A No. 2016-176337 is to be regarded as the accumulative time in which the diagnosis execution condition is satisfied, since the accumulative time accumulatively includes a response delay time, the accumulative time becomes longer than the time in which the purge air is actually suctioned (i.e., an effective time), possibly leading to an erroneous diagnosis.

It is desirable to provide a diagnostic apparatus for an evaporative fuel processing system for solving the above-mentioned problem. Specifically, in an engine equipped with a pressure charger, the diagnostic apparatus can more accurately perform a purge-flow diagnosis of an upstream purge line that allows a canister and an intake system of the engine to communicate with each other at the upstream side of the pressure charger, regardless of the operational state of the pressure charger (e.g., even when pressure-charging is temporarily interrupted).

First, the configuration of a diagnostic apparatus 1 for an evaporative fuel processing system according to the embodiment will be described with reference to FIG. 1. FIG. 1 illustrates the configuration of the diagnostic apparatus 1 and the configuration of an engine 10 to which the diagnostic apparatus 1 is applied.

The engine 10 is, for instance, a horizontally-opposed four-cylinder gasoline engine equipped with a pressure charger, such as a turbocharger 40. An output shaft (crankshaft) 10a of the engine 10 is coupled to, for instance, a manual transmission (not illustrated) with a dry clutch interposed therebetween. The manual transmission shifts gears in response to a manual operation by a driver, and converts and outputs torque (driving force) from the engine 10.

In an intake pipe (intake passage) 15 of the engine 10, an air cleaner 16, an airflow meter 14, the turbocharger 40, an intercooler 46, and an electronically-controlled throttle valve (simply referred to as "throttle valve" hereinafter) 13 are disposed from the upstream side.

The turbocharger 40 is a pressure charger disposed between the intake pipe 15 and an exhaust pipe (exhaust passage) 18 and performs turbocharging. The turbocharger 40 has a turbine 42 provided in the exhaust pipe 18 and a compressor 41 that is provided in the intake pipe 15 and that is linked with the turbine 42 by a rotation shaft 43. The turbocharger 40 drives the turbine 42 by using exhaust energy, thereby compressing the air with the compressor 41 coaxial therewith.

The intercooler 46 exchanges heat with intake air, having a high temperature as a result of being compressed by the turbocharger 40 (i.e., the compressor 41), so as to cool the intake air. The throttle valve 13 that adjusts the amount of intake air is disposed downstream of the intercooler 46.

In the engine 10, air taken in through the air cleaner 16 and turbocharged by the turbocharger 40, where appropriate, is throttled by the throttle valve 13, travels through an intake manifold 11, and is taken into the cylinders in the engine 10. The amount of air taken in through the air cleaner 16 (i.e., the amount of air taken into the engine 10) is detected by the airflow meter 14 disposed between the air cleaner 16 and the throttle valve 13. A vacuum sensor 30 that detects the pressure in the intake manifold 11 (intake-manifold pressure) is disposed inside a collector (surge tank) constituting the intake manifold 11. Furthermore, the throttle valve 13 is provided with a throttle opening-degree sensor 31 that detects the degree of opening of the throttle valve 13.

The cylinder heads of the cylinders are each provided with an intake port and an exhaust port. Each intake port and each exhaust port are respectively provided with an intake valve and an exhaust valve that open and close the intake port and the exhaust port. A variable valve timing mechanism 26 is disposed between an intake camshaft and an intake cam pulley that drive the intake valve. The variable valve timing mechanism 26 relatively rotates the intake cam pulley and the intake camshaft to continuously change the rotational phase (displacement angle) of the intake camshaft relative to the crankshaft 10a, thereby advancing and retarding the valve timing (open-close timing) of the intake valve. This variable valve timing mechanism 26 variably sets the open-close timing of the intake valve in accordance with the engine running mode.

Likewise, a variable valve timing mechanism 27 is disposed between an exhaust camshaft and an exhaust cam pulley. The variable valve timing mechanism 27 relatively rotates the exhaust cam pulley and the exhaust camshaft to continuously change the rotational phase (displacement angle) of the exhaust camshaft relative to the crankshaft 10a, thereby advancing and retarding the valve timing (open-close timing) of the exhaust valve. This variable valve timing mechanism 27 variably sets the open-close timing of the exhaust valve in accordance with the engine running mode.

Injectors 12 that inject fuel into the cylinders are attached to the respective cylinders of the engine 10. The injectors 12 inject fuel, pressurized by a high-pressure fuel pump 60, directly into combustion chambers of the cylinders.

The injectors 12 are coupled to a delivery pipe 61. The delivery pipe 61 distributes the fuel pressure-fed from the high-pressure fuel pump 60 via a fuel pipe 62 to the injectors 12. The high-pressure fuel pump 60 increases the pressure of fuel suctioned from a fuel tank 80 by a feed pump (low-pressure fuel pump) 64 to a high value (e.g., 8 to 13 MPa) in accordance with the running mode and feeds the fuel to the delivery pipe 61. In this embodiment, a pump driven by a camshaft of the engine 10 is used as the high-pressure fuel pump 60.

Ignition plugs 17 for igniting an air-fuel mixture and igniter-containing coils 21 for applying high voltage to the ignition plugs 17 are attached to the cylinder heads of the respective cylinders. In the cylinders of the engine 10, an air-fuel mixture containing the intake air and the fuel injected by the injectors 12 is combusted by being ignited by the ignition plugs 17. The exhaust gas after the combustion is discharged via the exhaust pipe 18.

The turbine 42 constituting the turbocharger 40 is provided downstream of a converging section of the exhaust pipe (exhaust passage) 18. The turbocharger 40 is provided with a waste gate 44 that causes the exhaust gas to travel through a bypass passage from an inlet to an outlet of the turbine 42, and is also provided with a waste gate valve 44a that opens and closes the waste gate 44. The degree of opening of the waste gate valve 44a is controlled by an engine control unit (referred to as "ECU" hereinafter) 50, so that the turbocharging pressure is adjusted.

An air-fuel ratio sensor 19A that outputs a signal according to the oxygen concentration in the exhaust gas is attached to the downstream side of the turbine 42. The air-fuel ratio sensor 19A used is a linear air-fuel ratio sensor (LAF sensor) that can linearly detect the air-fuel ratio of the exhaust gas. Alternatively, an $O_2$ sensor that detects the air-fuel ratio of the exhaust gas in an on-off fashion may be used as the air-fuel ratio sensor 19A.

A front exhaust purification catalyst (CAT) 201 is disposed downstream of the air-fuel ratio sensor 19A. The exhaust purification catalyst 201 is a three-way catalyst that simultaneously performs oxidation of hydrocarbon (HC) and carbon monoxide (CO) and reduction of nitrogen oxide ($NO_x$) in the exhaust gas, so as to purify a harmful gas component in the exhaust gas into harmless carbon dioxide ($CO_2$), water vapor ($H_2O$), and nitrogen ($N_2$). A rear (catalyzed) $O_2$ sensor 19B that detects the air-fuel ratio of the exhaust gas in an on-off fashion and a rear exhaust purification catalyst (CAT) 202 are provided downstream of the front exhaust purification catalyst (CAT) 201.

The fuel tank 80 retains fuel to be fed to the engine 10 (i.e., the injectors 12). The engine 10 is equipped with an evaporative fuel processing system 3 for feeding evaporative fuel generated in the fuel tank 80 to the combustion chambers, as well as the diagnostic apparatus 1 for the evaporative fuel processing system 3. The evaporative fuel processing system 3 and the diagnostic apparatus 1 mainly include the fuel tank 80, a canister 70, a vapor line 72, a downstream purge line 731, an upstream purge line 732, a downstream purge valve 741, an upstream purge valve 742, an evaporative leak check module (ELCM) 77, and the ECU 50.

An upper space of the fuel tank 80 communicates with the canister 70 via the vapor line (pipe) 72. The canister 70 is capable of adsorbing the evaporative fuel generated in the fuel tank 80 and has an adsorbent, such as activated carbon, therein so as to temporarily adsorb the evaporative fuel in the fuel tank 80.

The canister 70 communicates with the downstream side (e.g., the intake manifold 11) of the turbocharger 40 via the downstream (low-pressure) purge line (pipe) 731. Specifically, the downstream purge line 731 allows the canister 70 and an intake system of the engine 10 to communicate with each other at the downstream side (e.g., the intake manifold 11) of the turbocharger 40. Moreover, the canister 70 communicates with the upstream side (e.g., a pre-turbocharge duct) of the turbocharger 40 via the upstream (high-pressure) purge line (pipe) 732. Specifically, the upstream purge line 732 allows the canister 70 and the intake system of the engine 10 to communicate with each other at the upstream side (e.g., the pre-turbocharge duct) of the turbocharger 40. Although the upstream purge line 732 and the downstream purge line 731 have a partially sharing configuration in this embodiment, the upstream purge line 732 and the downstream purge line 731 may be provided independently of each other. The downstream purge line 731 and the upstream purge line 732 may sometimes be collectively referred to as a purge line 73 hereinafter.

The downstream (low-pressure) purge valve 741 that opens and closes the downstream purge line 731 is disposed in the downstream purge line 731. The downstream purge valve 741 is a variable-flow electromagnetic valve the degree of opening of which is adjusted by the ECU 50. For instance, the downstream purge valve 741 is opened when turbocharging is not performed (i.e., when the pressure of the intake manifold 11 is a negative value), and is closed when turbocharging is performed.

The upstream (high-pressure) purge valve 742 that opens and closes the upstream purge line 732 is disposed in the upstream purge line 732. The upstream purge valve 742 is a variable-flow electromagnetic valve the degree of opening of which is adjusted by the ECU 50. For instance, the upstream purge valve 742 is opened when turbocharging is performed (i.e., when the pressure of the intake manifold 11 is a positive value or close to a positive value), and is closed when turbocharging is not performed.

Furthermore, the canister 70 is coupled to the ELCM 77. The ELCM 77 mainly includes a switch valve 771, a pump 772, and a pressure sensor 773, and automatically detects a leakage of the evaporative fuel from the evaporative fuel processing system 3. In this embodiment, the ELCM 77 is used for a purge-flow diagnosis.

The switch valve 771 is closed during the purge-flow diagnosis so as to block the communication between the canister 70 (i.e., the purge line 73) and the atmosphere. Specifically, in one embodiment of the disclosure, the switch valve 771 may serve as a "blocking unit". For instance, a vane pump is used as the pump 772. At the start of the diagnosis, it is desirable that the pump 772 be temporarily driven so that the sealability is increased. The pressure sensor 773 detects the pressure in the upstream purge line 732 and the pressure in the downstream purge line 731. Specifically, in one embodiment of the disclosure, the pressure sensor 773 may serve as a "pressure detector". The control for driving the switch valve 771 and the pump 772 is performed by the ECU 50. Furthermore, the pressure sensor 773 is coupled to the ECU 50, and an electric signal (e.g., voltage) according to the pressure is read by the ECU 50.

As mentioned above, the opening and closing of the switch valve 771, the downstream purge valve 741, and the upstream purge valve 742 are controlled by the ECU 50. When a diagnosis of the upstream purge line 732 is to be performed, the switch valve 771 is closed, the downstream purge valve 741 is closed, and the upstream purge valve 742 is opened. Then, the purge-flow diagnosis is performed based on the pressure in the upstream purge line 732. If the state is normal, the evaporative fuel processing system 3 opens the upstream purge valve 742 during turbocharging, so that a purge flow that suctions out the evaporative fuel adsorbed in the canister 70 occurs in accordance with negative pressure occurring in the pre-turbocharge duct. In this case, the atmospheric side of the evaporative fuel processing system 3 is blocked by closing the switch valve 771 of the ELCM 77, so that the pressure in the upstream purge line 732 decreases if the purge flow has occurred from the upstream purge valve 742 toward the engine 10. Therefore, if a pressure decrease by a predetermined pressure or more is not detected even after a predetermined time period, it is determined that the state is abnormal.

When a diagnosis of the downstream purge line 731 is to be performed, the switch valve 771 is closed, the downstream purge valve 741 is opened, and the upstream purge valve 742 is closed. Then, the purge-flow diagnosis is performed based on the pressure in the downstream purge line 731.

When the evaporative fuel is to be purged during non-turbocharging, the switch valve 771 is opened, the downstream purge valve 741 is opened, and the upstream purge valve 742 is closed. Then, the evaporative fuel is purged via the downstream purge line 731. More specifically, when the downstream purge valve 741 is opened and the negative pressure in the intake manifold 11 acts on the canister 70, air is introduced into the canister 70 via the ELCM 77, so that the evaporative fuel adsorbed to the activated carbon in the canister 70 becomes desorbed therefrom. The desorbed evaporative fuel is suctioned together with the air introduced via the ELCM 77 into the intake manifold 11 of the engine 10 via the downstream purge line 731. Then, the evaporative fuel suctioned into the intake manifold 11 is combusted and processed in the cylinders of the engine 10.

When the evaporative fuel is to be purged during turbocharging, the switch valve 771 is opened, the downstream purge valve 741 is closed, and the upstream purge valve 742 is opened. Then, the evaporative fuel is purged via the upstream purge line 732. More specifically, when the upstream purge valve 742 is opened and the negative pressure in the pre-turbocharge duct acts on the canister 70, air is introduced into the canister 70 via the ELCM 77, so that the evaporative fuel adsorbed to the activated carbon in the canister 70 becomes desorbed therefrom. The desorbed evaporative fuel is suctioned together with the air introduced via the ELCM 77 into the pre-turbocharge duct of the engine 10 via the upstream purge line 732. Then, the evaporative fuel suctioned into the pre-turbocharge duct is combusted and processed in the cylinders of the engine 10.

In addition to the airflow meter 14, the LAF sensor 19A, the $O_2$ sensor 19B, the vacuum sensor 30, and the throttle opening-degree sensor 31 mentioned above, a cam angle sensor for distinguishing the cylinders of the engine 10 from one another is attached near the camshaft of the engine 10. Furthermore, a crank angle sensor 33 that detects a rotational position of the crankshaft 10a is attached near the crankshaft 10a of the engine 10. For instance, a timing rotor 33a with protrusions including 34 teeth at 10° intervals and lacking two teeth is attached to an end of the crankshaft 10a. The crank angle sensor 33 detects whether a protrusion of the timing rotor 33a is present or absent so as to detect the rotational position of the crankshaft 10a. For instance, electromagnetic pickup sensors are used as the cam angle sensor and the crank angle sensor 33.

These sensors are coupled to the ECU 50. Moreover, the ECU 50 is also coupled to various sensors including a water temperature sensor 34 that detects the temperature of a coolant in the engine 10, an oil temperature sensor 35 that detects the temperature of a lubricant, an accelerator-pedal opening-degree sensor 36 that detects the amount of depression of an accelerator pedal and the degree of opening (i.e., the amount of operation) of the accelerator pedal, and an outside air temperature sensor 37 that detects the outside air temperature.

For instance, the ECU 50 is coupled in a communicable manner via a controller area network (CAN) 100 to a meter control unit (referred to as "MCU" hereinafter) 56 that comprehensively controls a combination meter (not illustrated). The MCU 56 is coupled to a float-type fuel-amount sensor 81 that detects the amount of fuel (remaining amount of fuel) in the fuel tank 80. The MCU 56 transmits the detected fuel-amount data (remaining-fuel-amount data) to the ECU 50 via the CAN 100. The ECU 50 receives the fuel-amount data (remaining-fuel-amount data) via the CAN 100.

The ECU 50 includes a microprocessor that performs calculations, an electrically erasable programmable read-only memory (EEPROM) that stores programs for causing the microprocessor to execute processes, a random access memory (RAM) that stores various data, such as a calculation result, a backup RAM where the stored contents are retained by a battery, and an input-output interface (I/F). The ECU 50 also includes an injector driver that drives the injectors 12, an output circuit that outputs an ignition signal, and a motor driver that drives the electronically-controlled throttle valve 13 (electric motor). Moreover, the ECU 50 also includes drivers that drive the switch valve 771, the downstream purge valve 741, the upstream purge valve 742, and the waste gate 44.

In the ECU 50, the cylinders are distinguished from one another based on an output from the cam angle sensor, and the engine rotation speed is determined based on an output from the crank angle sensor 33. Furthermore, in the ECU 50, various pieces of information, such as the amount of intake air, the negative pressure in the intake pipe, the degree of opening of the accelerator pedal, the air-fuel ratio of the air-fuel mixture, the outside air temperature, and the water temperature and the oil temperature in the engine 10, are acquired based on detection signals input from the various sensors mentioned above. Then, the ECU 50 comprehensively controls the engine 10 by controlling the fuel injection amount, the ignition timing, and various devices, such as the throttle valve 13, the waste gate 44, the downstream purge valve 741, the upstream purge valve 742, and the switch valve 771, based on the acquired various pieces of information.

In particular, the ECU 50 has a function of performing the purge-flow diagnosis of the upstream purge line 732 more accurately, regardless of the operational state of the turbocharger 40 (e.g., even when the turbocharging is temporarily interrupted). Thus, the ECU 50 functionally includes a first timekeeping unit 501, a second timekeeping unit 502, a third timekeeping unit 503, a valve control unit 504, and a determining unit 505. In the ECU 50, a program stored in the EEPROM is executed by the microprocessor so that the functions of the first timekeeping unit 501, the second timekeeping unit 502, the third timekeeping unit 503, the valve control unit 504, and the determining unit 505 are realized.

The first timekeeping unit 501 includes either one of a counter and a timer. After a diagnosis execution condition including the amount of air taken into the engine 10 and the open-close status of the upstream purge valve 742 is satisfied and the purge-flow diagnosis of the upstream purge line 732 is started, the first timekeeping unit 501 accumulatively measures the time in which the diagnosis execution condition is satisfied. Specifically, in one embodiment of the disclosure, the first timekeeping unit 501 may serve as a "first timekeeper". The accumulative time measured by the first timekeeping unit 501 is output to the determining unit 505.

In particular, every time the upstream purge valve 742 is opened after the diagnosis execution condition is satisfied, the first timekeeper 501 accumulatively measures the time in which the diagnosis execution condition is satisfied after a predetermined delay time elapses from when a command for opening the upstream purge valve 742 is output. In this case, the delay time is desirably set in accordance with a response delay time (i.e., an ineffective time) from when the command for opening the upstream purge valve 742 is output to when the pressure actually starts to decrease. Moreover, it is desirable that the delay time be corrected in accordance with the amount of air taken into the engine 10.

It is desirable that, if the diagnosis execution condition is satisfied and the upstream purge valve 742 is opened two or more times during the purge-flow diagnosis, the first timekeeper 501 provide a delay time when the upstream purge valve 742 is opened for the second time and onward (i.e., does not provide a delay time when the upstream purge valve 742 is opened for the first time).

The second timekeeping unit 502 includes either one of a counter and a timer. After the purge-flow diagnosis is started (i.e., during the purge-flow diagnosis), the second timekeeping unit 502 measures the time in which the diagnosis execution condition is continuously not satisfied (i.e., continuous time in which the upstream purge valve 742 is continuously closed). Specifically, in one embodiment of the disclosure, the second timekeeping unit 502 may serve as a "second timekeeper". The continuous time measured by the second timekeeping unit 502 is output to the determining unit 505.

The third timekeeping unit 503 includes either one of a counter and a timer. After the purge-flow diagnosis is started, the third timekeeping unit 503 accumulatively measures the time in which the diagnosis execution condition is not satisfied (i.e., the time in which the upstream purge valve 742 is closed). Specifically, in one embodiment of the disclosure, the third timekeeping unit 503 may serve as a "third timekeeper". The accumulative time measured by the third timekeeping unit 503 is output to the determining unit 505.

The valve control unit 504 opens the upstream purge valve 742 when turbocharging is performed by the turbocharger 40, and closes the upstream purge valve 742 during non-turbocharging. Specifically, in one embodiment of the disclosure, the valve control unit 504 may serve as a "valve controller". During the purge-flow diagnosis of the upstream purge line 732, the valve control unit 504 maintains the downstream purge valve 741 in a closed state so as to prevent erroneous determination of a normal state as a result of a purge flow occurring due to the downstream purge valve 741.

The determining unit 505 determines that the state is normal if the pressure in the upstream purge line 732 detected by the pressure sensor 773 decreases by a predetermined pressure or more from the start of the diagnosis until the accumulative time measured by the first timekeeping unit 501 reaches a predetermined time (e.g., 6 seconds) or longer. In contrast, if the pressure in the upstream purge line 732 does not decrease by the predetermined pressure or more from the start of the diagnosis, the determining unit 505 determines that the state is abnormal. Specifically, in one embodiment of the disclosure, the determining unit 505 may serve as a determiner. The decrease in pressure has a correlation with the amount of purge flow suctioned from the upstream purge valve 742, and the amount of purge flow is dependent on the negative pressure occurring in the pre-turbocharge duct. The negative pressure occurring in the pre-turbocharge duct increases with increasing amount of work of the turbocharger 40 caused by an increase in the amount of intake air. Thus, by determining whether the state is normal or abnormal when the amount of intake air is larger than or equal to a predetermined amount and the opened state of the upstream purge valve 742 continues for a predetermined time or longer (i.e., when the state where the diagnosis execution condition is satisfied continues for a certain period or longer), the normal state and the abnormal state can be accurately distinguished from each other.

However, if the continuous time measured by the second timekeeping unit 502 reaches a predetermined time or longer (i.e., if the state where the diagnosis execution condition is not satisfied continues for the predetermined time or longer and the diagnosis is interrupted), the determining unit 505 ends (cancels) the purge-flow diagnosis. Because the closed state of the downstream purge valve 741 may possibly lead to a decrease in the amount of purging, it is desirable that the closed state be reduced. Thus, if the diagnosis execution condition is not satisfied for the predetermined time or longer, it is desirable that the effect on the amount of purging be reduced by cancelling the diagnosis and permitting opening control of the downstream purge valve 741.

If the accumulative time measured by the third timekeeping unit 503 reaches a predetermined time or longer (i.e., if the diagnosis is interrupted for the predetermined time or longer as a total), the determining unit 505 ends (cancels) the purge-flow diagnosis. If a running mode where turbocharging and non-turbocharging are repeated at time intervals to a degree at which the diagnosis is not cancelled by the second timekeeping unit 502 continues, a relatively long period of time is to be used until the time measured by the first timekeeping unit 501 reaches the predetermined time. In contrast, when a long period of time is to be used for the diagnosis, the effect of a pressure leakage from the ELCM 77 side becomes non-negligible, possibly making it difficult to perform the diagnosis with accuracy. Thus, when the accumulative time measured by the third timekeeping unit 503 reaches the predetermined time, it is desirable that the diagnosis be cancelled.

From the standpoint of prevention of an erroneous diagnosis, if the amount of fuel retained in the fuel tank 80 is larger than or equal to a predetermined amount and (or) the outside air temperature is below a predetermined temperature, it is desirable that the determining unit 505 confirm the diagnostic result. A pressure decrease in the upstream purge line 732 is affected by the negative pressure at the engine 10 side (i.e., the pre-turbocharge duct) and the volume of space in the evaporative fuel processing system 3. Specifically, the pressure decreases within a relatively short period of time as the volume of sealed space decreases. In contrast, a pressure decrease becomes moderate as the volume of space increases. The volume of space changes greatly in accordance with the amount of fuel remaining in the fuel tank 80. Furthermore, since a large amount of evaporative fuel is generated when the outside air temperature is high, it becomes difficult to perform the diagnosis with accuracy. Thus, as mentioned above, if the amount of fuel retained in the fuel tank 80 is larger than or equal to the predetermined amount and (or) the outside air temperature is below the predetermined temperature, it is desirable that the diagnostic result be confirmed.

Figure 2:
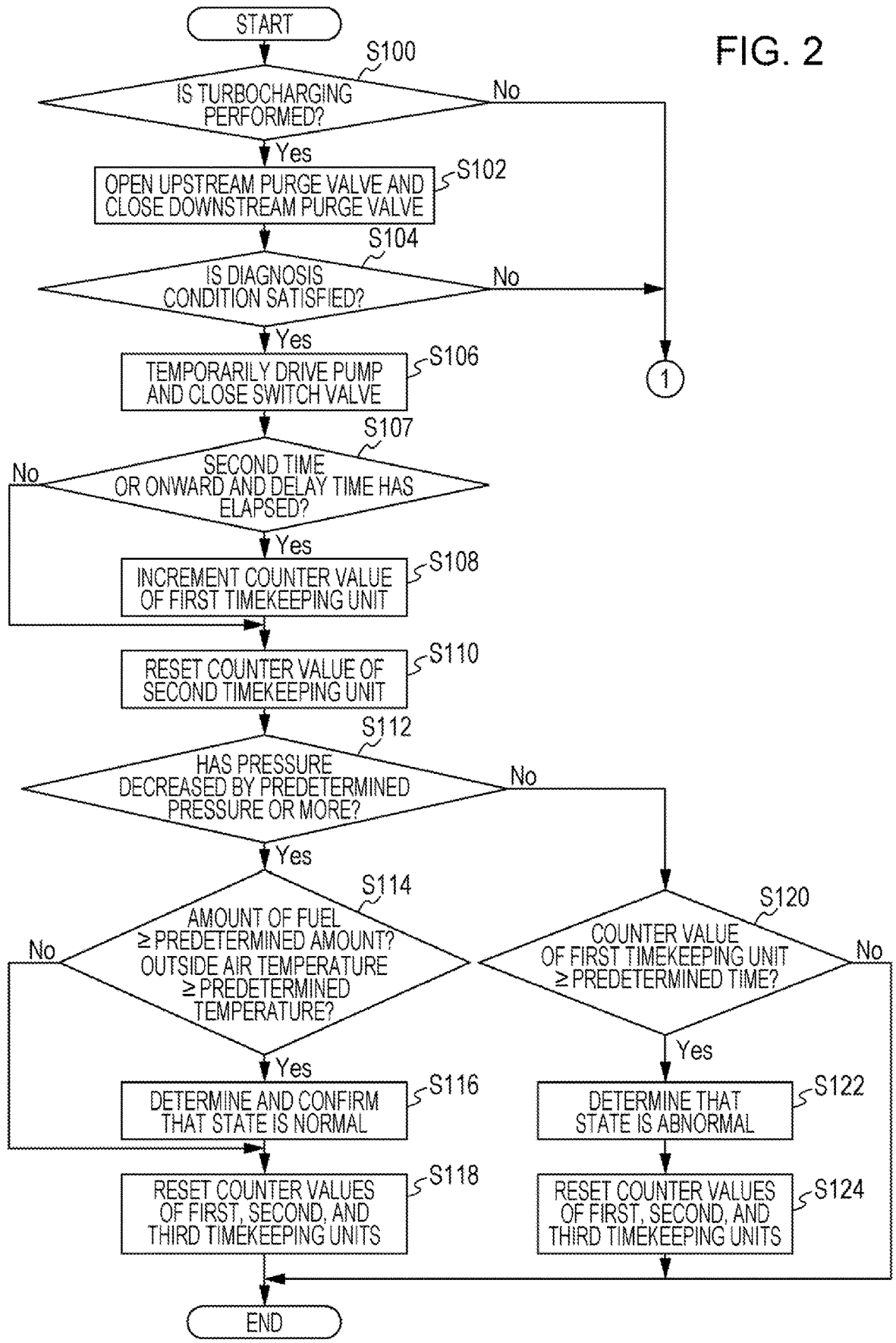
FIG. 2 is one of two flowcharts illustrating a procedure of a purge-flow diagnostic process performed by the diagnostic apparatus according to the embodiment.
Figure 3:
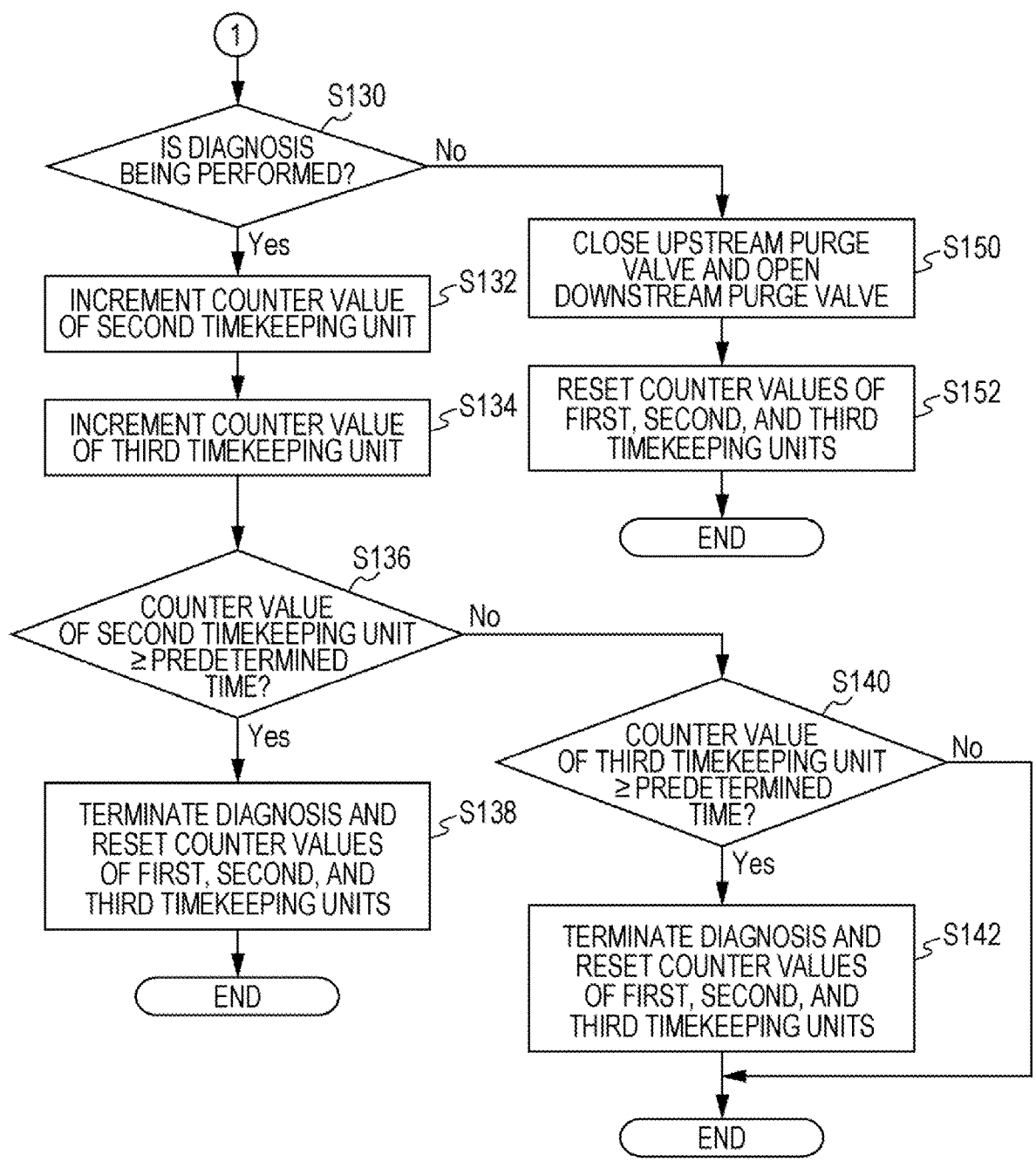
FIG. 3 is the other one of the two flowcharts illustrating the procedure of the purge-flow diagnostic process performed by the diagnostic apparatus according to the embodiment.
Figure 4:
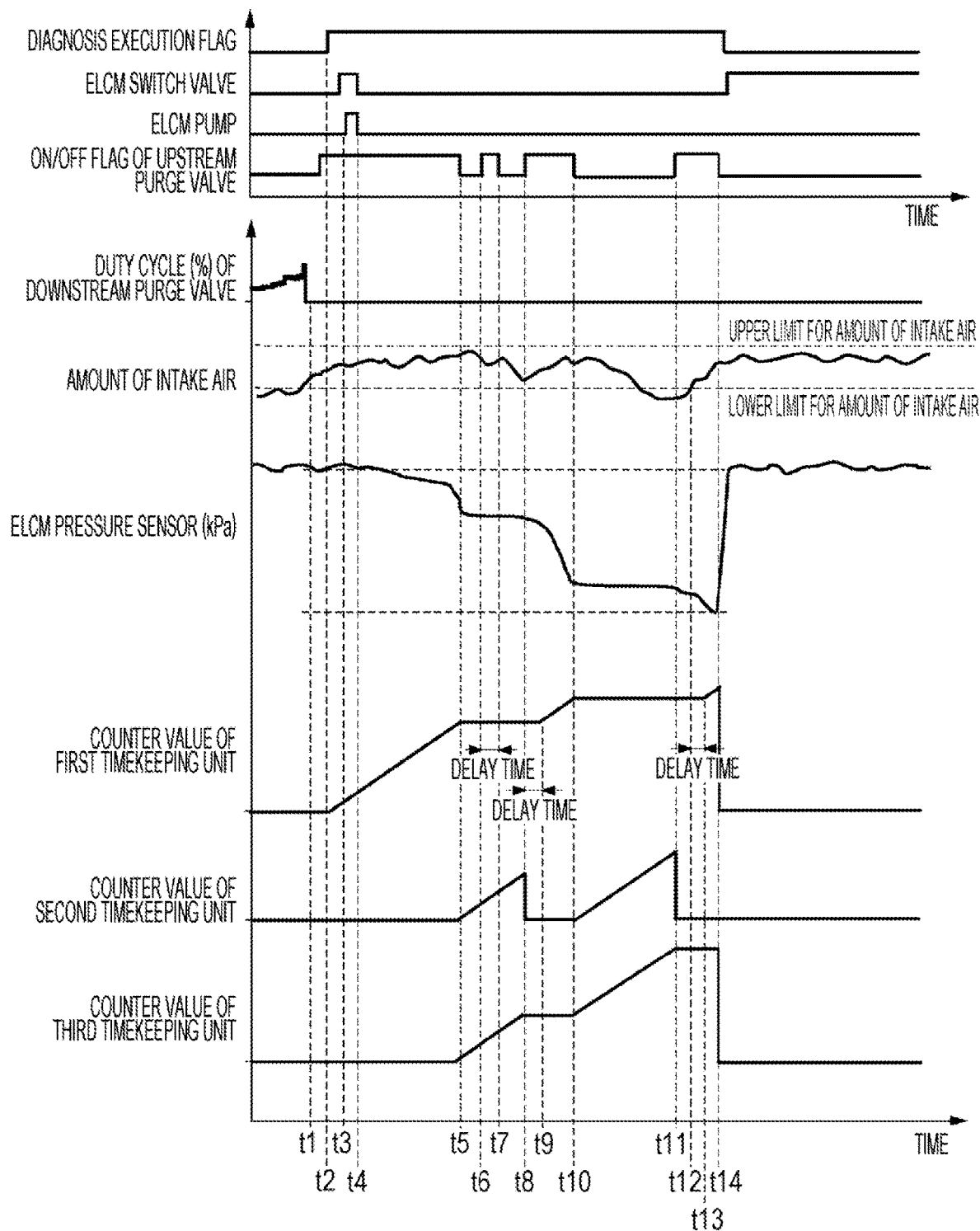
FIG. 4 is a timing chart illustrating an example of changes in a diagnosis execution flag, the status of a switch valve, the status of a pump, an open-close flag of an upstream purge valve, a duty cycle of a downstream purge valve, the amount of intake air, the internal pressure of an upstream purge line, and the time measured by each of first, second, and third timekeeping units, when the purge-flow diagnostic process is executed.

Next, the operation of the diagnostic apparatus 1 for the evaporative fuel processing system 3 will be described with reference to FIGS. 2 to 4. FIGS. 2 and 3 are flowcharts illustrating the procedure of a purge-flow diagnostic process performed by the diagnostic apparatus 1. This process is executed repeatedly at predetermined timings in the ECU 50. FIG. 4 is a timing chart illustrating an example of changes in a diagnosis execution flag, the status of the switch valve, the pump status, an open-close flag of the upstream purge valve, a duty cycle of the downstream purge valve, the amount of intake air, the internal pressure of the upstream purge line, and the time measured by each of the first, second, and third timekeepers, when the purge-flow diagnostic process is executed. In FIG. 4, the abscissa axis indicates time, whereas the ordinate axis indicates the diagnosis execution flag (on/off), the status (on/off) of the switch valve 771, the status (on/off) of the pump 772, the open-close flag of the upstream purge valve 742, the duty cycle (%) of the downstream purge valve 741, the amount (mg) of intake air, the internal pressure (kPa) of the upstream purge line, and the time (counter value) measured by each of the first, second, and third timekeepers 501 to 503, in that order from the top.

First, in step S100, it is determined whether turbocharging is being performed by the turbocharger 40. If turbocharging is being performed, the process proceeds to step S102. If turbocharging is not being performed (i.e., during non-turbocharging), the process proceeds to step S130.

In step S102, the downstream purge valve 741 is closed, and the upstream purge valve 742 is opened (see a time point t1 in FIG. 4). Then, in step S104, it is determined whether the purge-flow diagnosis execution condition is satisfied. More specifically, for instance, it is determined that the diagnosis execution condition is satisfied if the following conditions are satisfied: the battery voltage is higher than or equal to a threshold value, the atmospheric pressure is higher than or equal to a threshold value, a total amount of purge flow is larger than or equal to a threshold value, a predetermined non-purging period has elapsed, the outside air temperature is within a predetermined range, the amount of intake air is larger than or equal to a predetermined value, the second purge valve is on, and the fuel level is higher than or equal to a threshold value. If the purge-flow diagnosis execution condition is satisfied (see a time point t2 in FIG. 4), the process proceeds to step S106. In contrast, if the purge-flow diagnosis execution condition is not satisfied, the process proceeds to step S130.

In step S106, when the diagnosis is to be started, the switch valve 771 of the ELCM 77 is temporarily opened, and the pump 772 is temporarily driven (see time points t3 to t4 in FIG. 4). Subsequently, the switch valve 771 is closed (see the time point t4 and onward in FIG. 4).

Then, in step S107, it is determined whether the upstream purge valve 742 is opened for the second time or onward and whether a predetermined delay time has elapsed from when a command for opening the upstream purge valve 742 is output. If the upstream purge valve 742 is opened for the second time or onward and the predetermined delay time has elapsed (see time points t9 and t13 in FIG. 4), the process proceeds to step S108. If the upstream purge valve 42 is opened for the first time and/or the predetermined delay time has not elapsed (see time points t6 to t7, t8 to t9, and t12 to t13 in FIG. 4), the process proceeds to step S110.

In step S108, a counter value of the first timekeeping unit 501 is incremented (i.e., a timekeeping process is executed) (see time points t2 to t5, t9 to t10, and t13 to t14 in FIG. 4). In step S110, a counter value of the second timekeeping unit 502 is reset (see time points t2 to t5, t8 to t10, and t11 to t14 in FIG. 4).

Then, in step S112, it is determined whether the pressure in the upstream purge line 732 has decreased by a predetermined pressure or more from the start of the diagnosis. If the pressure has decreased by the predetermined pressure or more (see the time point t14 in FIG. 4), the process proceeds to step S114. If the pressure has not decreased by the predetermined pressure or more (see the time points t2 to t14 in FIG. 4), the process proceeds to step S120.

In step S114, it is determined whether the amount of fuel (i.e., the remaining amount of fuel) retained in the fuel tank 80 is larger than or equal to a predetermined amount and whether the outside air temperature is below a predetermined temperature (see the time point t14 in FIG. 4). If both of these conditions are satisfied, the process proceeds to step S116. If neither of these conditions or one of these conditions is not satisfied, the process proceeds to step S118 without performing step S116.

In step S116, it is confirmed that the purge flow in the upstream purge line 732 is normal. Then, in step S118, the counter values of the first timekeeping unit 501, the second timekeeping unit 502, and the third timekeeping unit 503 are reset, and the purge-flow diagnosis ends (see the time point t14 in FIG. 4). Subsequently, the process ends.

On the other hand, in step S120, it is determined whether the accumulative time (i.e., the counter value) measured by the first timekeeping unit 501 is longer than or equal to a predetermined time (i.e., whether the accumulative time in which the diagnosis execution condition is satisfied has reached the predetermined time or longer after the start of the diagnosis). If the accumulative time is longer than or equal to the predetermined time, the process proceeds to step S122. If the accumulative time is shorter than the predetermined time (see the time points t2 to t14 in FIG. 4), the process temporarily ends.

In step S122, it is determined that the purge flow in the upstream purge line 732 is abnormal. Then, in step S124, the counter values of the first timekeeping unit 501, the second timekeeping unit 502, and the third timekeeping unit 503 are reset, and the purge-flow diagnosis ends. Subsequently, the process ends.

During non-turbocharging, it is determined in step S130 whether the purge-flow diagnosis is being performed. If the diagnosis is being performed (see the time points t2 to t14 in FIG. 4), the process proceeds to step S132. If the diagnosis is not being performed (see the time point t14 and onward in FIG. 4), the process proceeds to step S150.

In step S132, the counter value of the second timekeeping unit 502 is incremented (i.e., a timekeeping process is executed) (see the time points t5 to t8 and the time points t10 to t11 in FIG. 4). Likewise, in step S134, the counter value of the third timekeeping unit 503 is incremented (i.e., a timekeeping process is executed) (see the time points t5 to t8 and the time points t10 to t11 in FIG. 4). Then, in step S136, it is determined whether the continuous time (e.g., the counter value) measured by the second timekeeping unit 502 is longer than or equal to a predetermined time (i.e., whether the diagnosis is interrupted for the predetermined time or longer) (see the time points t5 to t8 and the time points t10 to t11 in FIG. 4). If the continuous time is longer than or equal to the predetermined time, the process proceeds to step S138. If the continuous time is shorter than the predetermined time (see the time points t2 to t14 in FIG. 4), the process proceeds to step S140.

In step S138, the counter values of the first timekeeping unit 501, the second timekeeping unit 502, and the third timekeeping unit 503 are reset, and the purge-flow diagnosis ends. Subsequently, the process ends.

On the other hand, in step S140, it is determined whether the accumulative time (i.e., the counter value) measured by the third timekeeping unit 503 is longer than or equal to a predetermined time (i.e., whether the diagnosis is interrupted for the predetermined time or longer as a total) (see the time points t5 to t8 and the time points t10 to t11 in FIG. 4). If the accumulative time is longer than or equal to the predetermined time, the process proceeds to step S142. If the accumulative time is shorter than the predetermined time (see the time points t2 to t14 in FIG. 4), the process temporarily ends.

In step S142, the counter values of the first timekeeping unit 501, the second timekeeping unit 502, and the third timekeeping unit 503 are reset, and the purge-flow diagnosis ends. Subsequently, the process ends.

On the other hand, if the diagnosis is not being performed, the switch valve 771 is opened, the downstream purge valve 741 is opened, and the upstream purge valve 742 is closed in step S150. In other words, a normal purging process is executed (see the time point t14 and onward in FIG. 4). Then, in step S152, the counter values of the first timekeeping unit 501, the second timekeeping unit 502, and the third timekeeping unit 503 are reset, and the process subsequently ends (see the time point t14 and onward in FIG. 4).

As described above in detail, according to this embodiment, the upstream purge valve 742 is opened when turbocharging is performed by the turbocharger 40, and the upstream purge valve 742 is closed during non-turbocharging. After the diagnosis execution condition including the amount of air taken into the engine 10 and the open-close status of the upstream purge valve 742 is satisfied and the purge-flow diagnosis in the upstream purge line 732 is started, the time in which the diagnosis execution condition is satisfied is accumulatively measured. It is determined that the state is normal when the pressure in the upstream purge line 732 has decreased by the predetermined pressure or more from the start of the diagnosis until the measured accumulative time reaches the predetermined time. In contrast, it is determined that the state is abnormal if the pressure in the upstream purge line 732 has not decreased by the predetermined pressure or more from the start of the diagnosis. Specifically, since the accumulative time in which the diagnosis execution condition is satisfied is measured, even if the turbocharging by the turbocharger 40 is interrupted and the diagnosis execution condition is temporarily not satisfied (i.e., even if the diagnosis is temporarily interrupted), the diagnosis may be resumed when the diagnosis execution condition is satisfied again. Thus, the diagnosis can be performed even in an operational pattern where turbocharging is not continuously performed.

Furthermore, in that case (i.e., when the accumulative time is to be measured), every time the upstream purge valve 742 is opened after the diagnosis execution condition is satisfied (i.e., during the purge-flow diagnosis), the time in which the diagnosis execution condition is satisfied is accumulatively measured after the predetermined delay time elapses from when the command for opening the upstream purge valve 742 is output. Therefore, the accumulative time can be measured while excluding the time that does not contribute to a pressure decrease, that is, the response delay time (i.e., ineffective time) from when the command for opening the upstream purge valve 742 is output to when the pressure starts to decrease as a result of evaporative fuel (purge air) being actually suctioned through the upstream purge valve 742. In other words, only the time in which the purge air is actually suctioned (i.e., effective time) can be accumulatively measured. Thus, even in a case where the diagnosis execution condition is intermittently satisfied during the diagnosis, such as a case where turbocharging is temporarily interrupted during the diagnosis and is subsequently resumed (i.e., a case where the upstream purge valve 742 is temporarily closed during the diagnosis and is subsequently opened again), the response delay time (ineffective time) can be prevented from being accumulatively included in the accumulative time. As a result, the purge-flow diagnosis of the upstream purge line 732 can be performed more accurately, regardless of the operational state of the turbocharger 40 (e.g., even when the turbocharging is temporarily interrupted).

Furthermore, according to this embodiment, the aforementioned delay time is set in accordance with the response delay time from when the command for opening the upstream purge valve 742 is output to when the pressure actually starts to decrease. Therefore, the response delay time (ineffective time), that is, the time that does not contribute to a pressure decrease, can be removed more accurately.

The response delay time is affected by the amount of air taken into the engine 10. In contrast, according to this embodiment, the effect of the amount of intake air is corrected, so that the response delay time can be removed more accurately.

If the aforementioned predetermined time is to be set in accordance with compatibility (i.e., if the aforementioned predetermined time is to be determined in an actual apparatus), the response delay time (ineffective time) is included in the predetermined time. Thus, according to this embodiment, a delay time is not provided when the upstream purge valve 742 is opened for the first time, so that the correlation with a compatible value (compatibility condition) can be enhanced.

According to this embodiment, after the purge-flow diagnosis is started, the time in which the diagnosis execution condition is not satisfied is measured, and the diagnosis is terminated when the measured continuous time reaches the predetermined time or longer (i.e., when the diagnosis is interrupted continuously for the predetermined time or longer). Therefore, the diagnosis can be terminated (cancelled) if the interrupted time of the diagnosis is long, thereby preventing a long continuous period of a state (diagnostic state) different from normal control.

According to this embodiment, after the purge-flow diagnosis is started, the time in which the diagnosis execution condition is not satisfied is accumulatively measured. If the measured accumulative time reaches the predetermined time or longer (i.e., if the diagnosis is interrupted for the predetermined time or longer as a total), the diagnosis is terminated. Therefore, for instance, if short interruptions of the diagnosis occur frequently, the diagnosis can be terminated (cancelled), thereby preventing an erroneous diagnosis.

According to this embodiment, when the purge-flow diagnosis of the upstream purge line 732 is being performed, the downstream purge valve 741 disposed in the downstream purge line 731 is closed. Specifically, even if turbocharging is interrupted during the diagnosis, the downstream purge valve 741 is maintained in the closed state (i.e., prohibited from being opened). Therefore, evaporative fuel can be prevented from being suctioned (purged) from the downstream purge line 731 during the diagnosis, thereby preventing an erroneous diagnosis.

According to this embodiment, if the amount of fuel retained in the fuel tank 80 is larger than or equal to the predetermined amount and (or) the outside air temperature is below the predetermined temperature, the aforementioned diagnostic result is confirmed. Specifically, if the space in the fuel tank 80 is small, the pressure in the upstream purge line 732 tends to decrease readily, thus reducing the possibility of an erroneous diagnosis (erroneous determination). Likewise, if the outside air temperature is relatively low and there is less occurrence of evaporative fuel, the pressure in the upstream purge line 732 tends to decrease readily, thus reducing the possibility of an erroneous diagnosis (erroneous determination). Consequently, an erroneous diagnosis can be prevented more reliably.

According to this embodiment, the communication between the canister 70 and the atmosphere is blocked during the purge-flow diagnosis. Therefore, introduction of the atmosphere from the canister 70 to the upstream purge line 732 is blocked to facilitate a decrease in pressure in the upstream purge line 732, thereby preventing an erroneous diagnosis.

According to this embodiment, the diagnostic apparatus 1 for the evaporative fuel processing system 3 is installed in a vehicle equipped with a manual transmission. Therefore, even if the turbocharging is interrupted (i.e., the diagnosis is interrupted) due to shifting of gears, the diagnosis can be resumed when the diagnosis execution condition is satisfied again. Consequently, the frequency at which the purge-flow diagnosis is performed can be increased more effectively.

Although the embodiment of the disclosure has been described above, the disclosure is not limited to the above embodiment and permits various modifications. For instance, as an alternative to the above embodiment in which the ELCM 77 serves as both the switch valve 771 and the pressure sensor 773, these components may be provided independently of each other. Furthermore, the purge-flow diagnosis execution condition for the upstream purge line 732 is not limited to that in the above embodiment and may be set to any condition in accordance with a desired condition.

In the above embodiment, the delay time is corrected in accordance with the amount of intake air. Alternatively, for example, the delay time may be corrected in accordance with parameters other than the amount of intake air, such as the turbocharging pressure of the turbocharger 40 and the engine running mode (such as the rotational speed). Moreover, the effects caused by differences in hardware may be learned, and the learned values may be used for correcting the delay time.

Moreover, as an alternative to the above embodiment in which a turbocharger is used as a pressure charger, the pressure charger is not limited to a turbocharger and may be, for instance, a supercharger. Likewise, as an alternative to the above embodiment that is applied to a gasoline-engine vehicle, an embodiment of the disclosure may be applied to, for instance, a hybrid electric vehicle (HEV) and a plug-in hybrid electric vehicle (PHEV).

In an engine equipped with a pressure charger, the disclosure can more accurately perform a purge-flow diagnosis of an upstream purge line that allows a canister and an intake system of the engine to communicate with each other at the upstream side of the pressure charger, regardless of the operational state of the pressure charger (e.g., even when pressure-charging is temporarily interrupted).

The invention claimed is:

1. A diagnostic apparatus for an evaporative fuel processing system, comprising:
   a fuel tank configured to retain fuel to be fed to an engine equipped with a pressure charger;
   a canister configured to communicate with the fuel tank and capable of adsorbing evaporative fuel generated in the fuel tank;
   an upstream purge line configured to allow the canister and an intake system of the engine to communicate with each other at an upstream side of the pressure charger;
   an upstream purge valve disposed in the upstream purge line and configured to open and close the upstream purge line;
   a pressure detector configured to detect pressure in the upstream purge line;
   a valve controller configured to open the upstream purge valve when pressure-charging is performed by the pressure charger and to close the upstream purge valve during non-pressure-charging;
   a first timekeeper configured to accumulatively measure a time in which a diagnosis execution condition, including an amount of air taken into the engine and an open-close status of the upstream purge valve, is satisfied after the diagnosis execution condition is satisfied and a diagnosis for a purge flow in the upstream purge line is started; and a determiner configured to determine that the evaporative fuel processing system operates normally if the pressure in the upstream purge line detected by the pressure detector decreases by a predetermined pressure or more from the start of the diagnosis until an accumulative time measured by the first timekeeper reaches a predetermined time, and to determine that the evaporative fuel processing system operates abnormally if the pressure in the upstream purge line does not decrease by the predetermined pressure or more from the start of the diagnosis, wherein, every time the upstream purge valve is opened after the diagnosis execution condition is satisfied, the first timekeeper accumulatively measures the time in which the diagnosis execution condition is satisfied after a predetermined delay time elapses from when a command for opening the upstream purge valve is output.

2. The diagnostic apparatus according to claim 1, wherein the delay time is set in accordance with a response delay time from when the command for opening the upstream purge valve is output to when the pressure actually starts to decrease.

3. The diagnostic apparatus according to claim 2, wherein the delay time is corrected in accordance with the amount of air taken into the engine.

4. The diagnostic apparatus according to claim 2, wherein, in a case where the diagnosis execution condition is satisfied and the upstream purge valve is opened two or more times during the diagnosis for the purge flow, the first timekeeper provides the delay time when the upstream purge valve is opened for a second time and onward.

5. The diagnostic apparatus according to claim 2, the apparatus further comprising:

a second timekeeper configured to measure a time in which the diagnosis execution condition is continuously not satisfied after the start of the diagnosis, wherein the determiner ends the diagnosis if a continuous time measured by the second timekeeper reaches a predetermined time or longer.

6. The diagnostic apparatus according to claim 2, the apparatus further comprising:

a third timekeeper configured to accumulatively measure a time in which the diagnosis execution condition is not satisfied after the start of the diagnosis, wherein the determiner ends the diagnosis if an accumulative time measured by the third timekeeper reaches a predetermined time or longer.

7. The diagnostic apparatus according to claim 2, the apparatus further comprising:

a downstream purge line configured to allow the canister and the intake system of the engine to communicate with each other at a downstream side of the pressure charger; and a downstream purge valve disposed in the downstream purge line and configured to open and close the downstream purge line, wherein the valve controller closes the downstream purge valve during the diagnosis.

8. The diagnostic apparatus according to claim 2, wherein, if an amount of fuel retained in the fuel tank is larger than or equal to a predetermined amount and/or an outside air temperature is below a predetermined temperature, the determiner confirms a diagnostic result.

9. The diagnostic apparatus according to claim 2, the apparatus further comprising:

a blocking unit configured to block communication between the canister and atmosphere during the diagnosis.

10. The diagnostic apparatus according to claim 2, wherein the diagnostic apparatus is installed in a vehicle that comprises a manual transmission configured to shift gears in response to a manual operation and to convert and output torque of the engine.

11. The diagnostic apparatus according to claim 1, wherein, in a case where the diagnosis execution condition is satisfied and the upstream purge valve is opened two or more times during the diagnosis for the purge flow, the first timekeeper provides the delay time when the upstream purge valve is opened for a second time and onward.

12. The diagnostic apparatus according to claim 1, the apparatus further comprising:

a second timekeeper configured to measure a time in which the diagnosis execution condition is continuously not satisfied after the start of the diagnosis, wherein the determiner ends the diagnosis if a continuous time measured by the second timekeeper reaches a predetermined time or longer.

13. The diagnostic apparatus according to claim 1, the apparatus further comprising:

a third timekeeper configured to accumulatively measure a time in which the diagnosis execution condition is not satisfied after the start of the diagnosis, wherein the determiner ends the diagnosis if an accumulative time measured by the third timekeeper reaches a predetermined time or longer.

14. The diagnostic apparatus according to claim 1, the apparatus further comprising:

a downstream purge line configured to allow the canister and the intake system of the engine to communicate with each other at a downstream side of the pressure charger; and a downstream purge valve disposed in the downstream purge line and configured to open and close the downstream purge line, wherein the valve controller closes the downstream purge valve during the diagnosis.

15. The diagnostic apparatus according to claim 1, wherein, if an amount of fuel retained in the fuel tank is larger than or equal to a predetermined amount and/or an outside air temperature is below a predetermined temperature, the determiner confirms a diagnostic result.

16. The diagnostic apparatus according to claim 1, the apparatus further comprising:

a blocking unit configured to block communication between the canister and atmosphere during the diagnosis.

17. The diagnostic apparatus according to claim 1, wherein the diagnostic apparatus is installed in a vehicle that comprises a manual transmission configured to shift gears in response to a manual operation and to convert and output torque of the engine.

18. A diagnostic apparatus for an evaporative fuel processing system, comprising:

a fuel tank configured to retain fuel to be fed to an engine equipped with a pressure charger;

a canister configured to communicate with the fuel tank and capable of adsorbing evaporative fuel generated in the fuel tank;

an upstream purge line configured to allow the canister and an intake system of the engine to communicate with each other at an upstream side of the pressure charger;

an upstream purge valve disposed in the upstream purge line and configured to open and close the upstream purge line;

a pressure detector configured to detect pressure in the upstream purge line; and circuitry configured to
   open the upstream purge valve when pressure-charging is performed by the pressure charger and to close the upstream purge valve during non-pressure-charging;
   accumulatively measure a time in which a diagnosis execution condition, including an amount of air taken into the engine and an open-close status of the upstream purge valve, is satisfied after the diagnosis execution condition is satisfied and a diagnosis for a purge flow in the upstream purge line is started; and
   determine that the evaporative fuel processing system operates normally if the pressure in the upstream purge line detected by the pressure detector decreases by a predetermined pressure or more from the start of the diagnosis until an accumulative time reaches a predetermined time, and determine that the evaporative fuel processing system operates abnormally if the pressure in the upstream purge line does not decrease by the predetermined pressure or more from the start of the diagnosis, wherein, every time the upstream purge valve is opened after the diagnosis execution condition is satisfied, the circuitry measures the time in which the diagnosis execution condition is satisfied after a predetermined delay time elapses from when a command for opening the upstream purge valve is output.

* * * * *